J. FREW.
Moth Trap for Bee Hives.
No. 37,618. Patented Feb. 10, 1863.
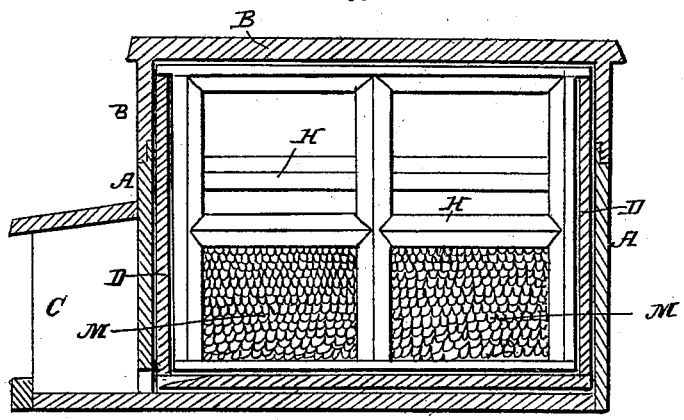
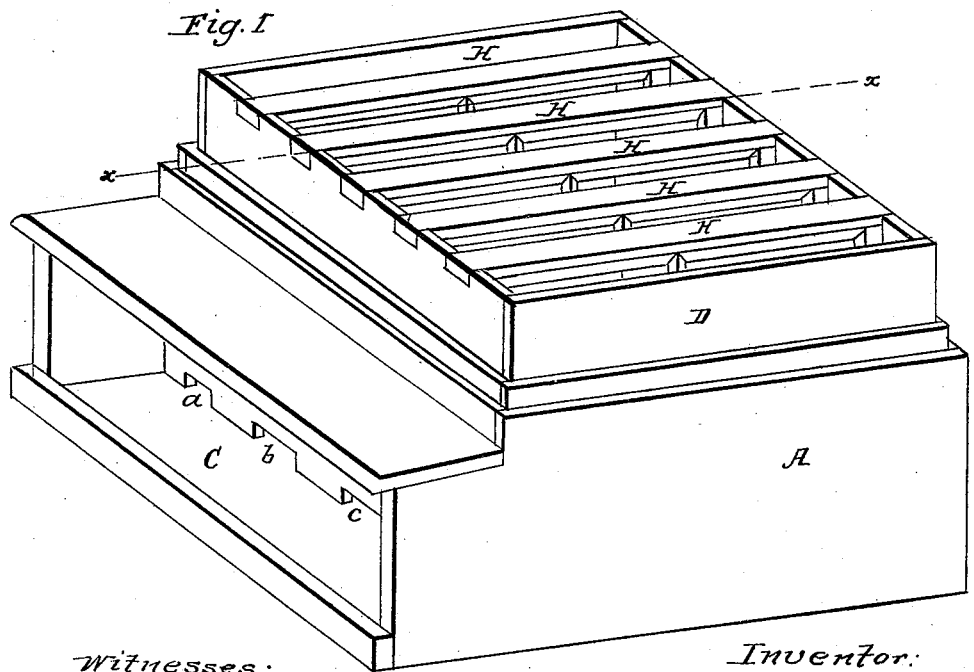
Witnesses:
Charles Smith
J. A. Tauberschmidt
Inventor:
John Frew
By Churm & Co
Attys

UNITED STATES PATENT OFFICE.

JOHN FREW, OF MEADVILLE, PENNSYLVANIA.

IMPROVEMENT IN MOTH-TRAPS.

Specification forming part of Letters Patent No. 37,618, dated February 10, 1863.

*To all whom it may concern:*

Be it known that I, JOHN FREW, of Meadville, in the county of Crawford and State of Pennsylvania, have invented a new and Improved Bee-Moth Trap; and I do hereby declare that the following is a full and exact description of the same, reference being had to the accompanying drawings and the letters of reference marked thereon.

My invention is based upon the facts following: First, that the miller or bee-moth only seeks the hive of the bee to deposit its eggs from necessity as the only suitable place it can find for that purpose; second, that the moth dislikes and fears the bee as much and more than the bee the moth, and therefore never works in the daytime, even in a dark hive, but waits until the bees are at rest; third, if, therefore, you offer the same inducements to the moth to deposit its eggs in some other place than the hive where the bees are at work, it will do so.

Figure 1 represents a perspective view of the trap with the cover removed. Fig. 2 is a vertical section of the trap at $x$ $x$, Fig. 1.

Similar letters of reference indicate corresponding parts in both views.

A is the outer case or main body of the trap; B, a cover. C is a "porch" for the moths to light upon. $a$ $b$ $c$ are entrances into the trap, similar to the openings to a common bee-hive. D is an inner box, which may be lifted out of the case A. H H are comb-frames suspended in the box D. M M is old honey-comb partially filled with honey and "bee-bread." All the frames have a piece of comb suspended in them, as shown in Fig. 2. The outside of the trap should be painted white. One of these traps is to be placed among a number of bee-hives, and will be preferred by the bee-moth to the hive, where they are disturbed by the bees. They lay their eggs within the box D. As soon as they are hatched, the worm will find plenty of food in the old comb suspended in the frames H H H H. Now, by this construction the frames H H and the box D can at any time be removed, and the eggs and worms of the moth destroyed.

Having thus described my invention, what I claim as new therein, and desire to secure by Letters Patent, is—

A bee-moth trap consisting of an external case, A, cover B, porch C, inner removable close box, D, provided with comb-frames H, the whole being constructed, combined, and arranged in the manner and for the purposes herein specified.

JOHN FREW.

Witnesses:
A. B. RICHMOND,
S. J. CLARK.